Aug. 5, 1924. 1,503,677
F. G. WARBURTON
CONTROLLING MEANS FOR CONTROLLING A SERIES OF ELECTRIC MOTORS
Filed March 26, 1920 2 Sheets-Sheet 1
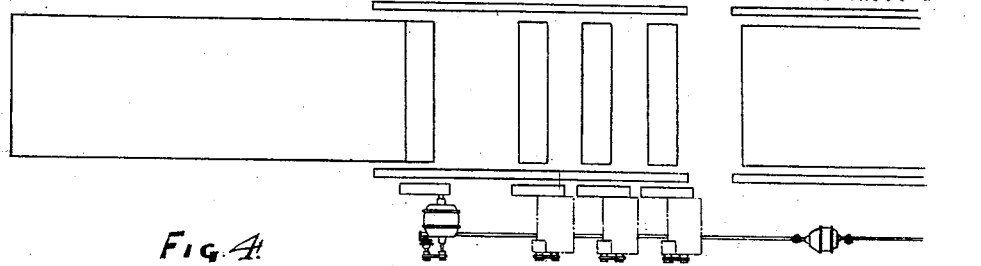
FIG. 4.
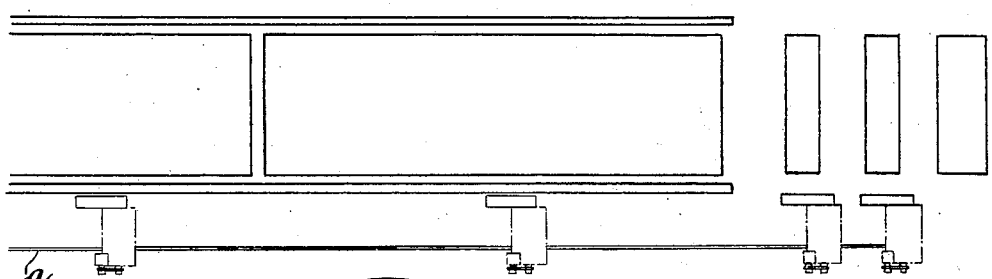
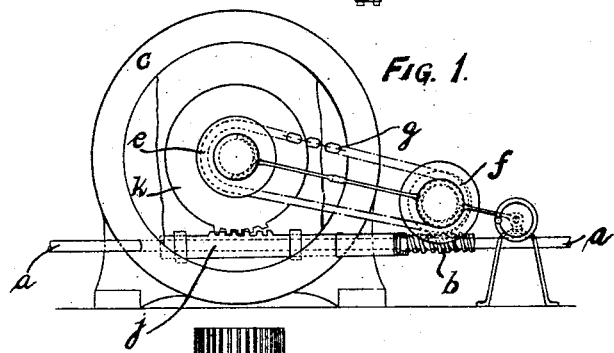
FIG. 1.
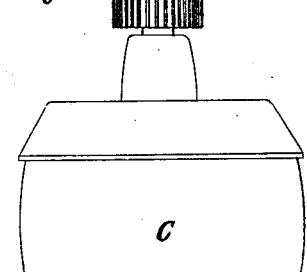
FIG. 2.
Inventor
Frank Greaves Warburton
By Gifford T. Bull
his Attorneys Aug. 5, 1924.
F. G. WARBURTON
1,503,677
CONTROLLING MEANS FOR CONTROLLING A SERIES OF ELECTRIC MOTORS
Filed March 26, 1920    2 Sheets-Sheet 2
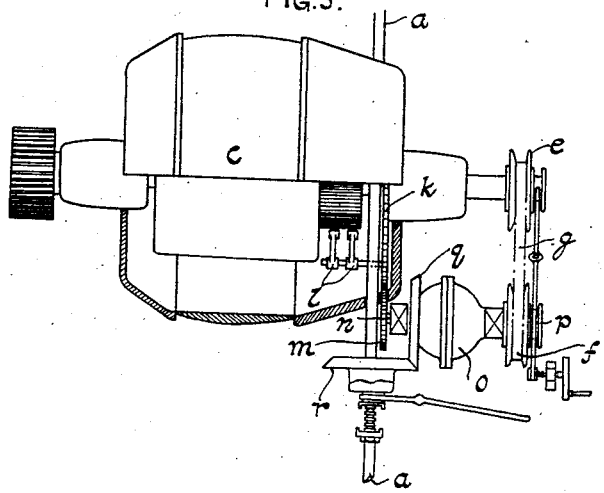

Patented Aug. 5, 1924.

1,503,677

UNITED STATES PATENT OFFICE.

FRANK GREAVES WARBURTON, OF LONDON, ENGLAND.

CONTROLLING MEANS FOR CONTROLLING A SERIES OF ELECTRIC MOTORS.

Application filed March 26, 1920. Serial No. 368,923.

*To all whom it may concern:*

Be it known that I, FRANK GREAVES WARBURTON, a subject of the King of the United Kingdom of Great Britain and Ireland, and residing at London, England, have invented a certain new and useful Improvement in Controlling Means for Controlling a Series of Electric Motors, of which the following is a specification.

This invention relates to improvements in controlling means for a series of electric motors, and is particularly adapted for use with motor driven paper making machines and the like driven by a series of motors which must be kept in absolute speed harmony. The invention consists more particularly in improvements in the type of controlling means described in United States Patent No. 1,335,357, which was issued on or about March 30, 1920.

My invention more particularly relates to the control of a series of alternating current commutator motors which are to run in harmony with a speed member, and particularly relates to such combination as applied to the driving of a paper machine, or the like.

The invention is illustrated by way of example in the accompanying drawings in which Fig. 1 is an end elevation and Fig. 2 a plan of one of the motors to be controlled showing one form of control. Fig. 3 is a plan view of another embodiment of the controlling means and showing one of the motors to be controlled, and Fig. 4 is a plan view showing the general arrangement of the motors and master control.

In the embodiment illustrated in Figs. 1 and 2 the master control, consisting of a master control shaft $a$ running lengthwise of the paper machine or the like, is fitted with a worm $b$ for each motor $c$ to be controlled, the worm $b$ being feathered on the shaft $a$ so as to take part in the rotation of the shaft but free to move axially thereon. Each motor $c$ to be controlled drives a motor speed index shaft $d$ through a speed change device such as cone pulleys $e$, $f$, and a belt $g$, friction discs, or the equivalent, and on the motor driven or speed index shaft $d$ of each motor to be controlled is mounted a worm wheel $h$ keyed to said shaft $d$ and adapted to mesh with the corresponding worm $b$. On shaft $a$ is also loosely mounted for axial displacement thereon a rack member $j$ adapted to be displaced on axial displacement of the worm $b$. This rack member $j$ meshes with a pinion $k$ loosely mounted on the motor end-plate and carries the brushes $l$ adapted to contact with the commutator bars of the motor to be controlled. When the master control shaft $a$ and the driven shaft $d$ run at the designed speed ratio there will be no tendency for the worm $b$ to move in its free direction along the shaft $a$, but if the controlled motor $c$ should run at an incorrect speed ratio to the master shaft then the worm $b$ must move along the shaft $a$ in a longitudinal direction. Depending on whether the motor is running slower or quicker than the ratio set between it and the master control shaft $a$ the worm $b$ will move one way or another moved by the resultant unbalanced speed of the meshing gears and will act quite positively. Now the translatory movement of the worm $b$ will cause movement of the rack member $j$ in the same direction and will produce a rotary movement of the pinion $k$ and an alteration of the position of the brushes in one direction or the other relatively to the commutator $l$ of the motor thereby producing an increase or decrease in the speed of the motor.

The sleeve $b$ surrounding the shaft $a$ thus serves as a resultant-transmitting member associated with each differential train, which is normally stationary while the normal speed ratio between the shaft $a$ and the associated motor is maintained, and whereby a variation of the speed ratio produces movement of said sleeve axially of the shaft, thereby shifting the brushes of the motor.

In the embodiment shown in Fig. 3 applied to a three phase commutator motor the pinion $k$ carrying the brushes $l$ and serving as a brush rocker is actuated by a pinion $m$ carried by the one shaft $n$ of a differential $o$ the other shaft $p$ of which is driven from the motor $c$ to be controlled through a finely variable speed change device such as pulleys $e$, $f$, and belt $g$ the pulley $e$ being mounted on the shaft of the motor $c$ to be controlled and the pulley $f$ on the shaft of the differential, the differential casing being itself driven by a bevel pinion $q$ keyed thereon from a bevel pinion $r$ carried on the control shaft $a$. On variation of the set speed ratio between the motor and the master control the pinion on the end of the differential shaft rotates the brush regulating pinion moving the brushes around the commutator and thereby effecting a speed correction on the motor to be controlled.

A speed change device is necessary in connection with paper machine driving between the motor to be controlled and the master control shaft but it is clear that the same purpose would be served wherever this speed change device is placed so long as it allows of relative speed change between the master control shaft and the motor to be controlled.

It is to be understood that the embodiments shown are only to be considered as examples in the application of the device and the speed correction of the motor to be controlled may be effected in other ways without departure from the scope of the invention.

What I claim is:—

1. In a system of motor control for the drive of the rolls of paper machines and the like, a plurality of alternating current commutator motors with brushes engaging therewith, a master control member comprising a shaft extending lengthwise of the drive and adjacent each of said motors, a differential train of gearing interposed between said master control member and each of the motors to be controlled, said differential gearing including a worm rotatable with and axially movable on said shaft, a sleeve axially movable on said shaft, a rack on said sleeve, a pinion supporting the brushes of each motor to be controlled, said pinion meshing with said rack, and a change speed device interposed between one side of the differential train and its driving member, substantially as and for the purpose set forth.

2. In combination with an alternating current commutator motor and the brushes engaging therewith, a rotary member provided with gear teeth on which said brushes are mounted, a master control member comprising a shaft associated with said motor, a sleeve mounted on and rotatable with said shaft and movable axially thereof, a worm wheel actuated by said motor, said sleeve being provided with a worm engaging said worm wheel, and also being provided with a gear engaging the gear teeth of said rotary member, the parts being constructed and arranged so that with the normal speed ratio between said shaft and said motor maintained, movement of said sleeve axially of said shaft will be prevented, and whereby variation of the normal speed ratio between said shaft and its associated motor will cause movement of said sleeve axially of the shaft and a shifting of said brushes.

In testimony whereof I have signed my name to this specification in the presence of two subscribing witnesses.

FRANK GREAVES WARBURTON.

Witnesses:
ERNALD SIMPSON MOSELEY,
GEORGE WEAVER.